United States Patent [19]
Smith

[11] 3,957,224
[45] May 18, 1976

[54] REEL-IN SPOOLED FISHLINE DISPENSER

[76] Inventor: Pete Hugh Smith, P.O. Box 403, Dora, Ala. 35062

[22] Filed: Jan. 7, 1975

[21] Appl. No.: 539,055

[52] U.S. Cl. .............................. 242/129.6; 43/25; 242/84.1 K
[51] Int. Cl.² .................... A01K 87/00; B65H 49/00
[58] Field of Search .......... 242/85, 96, 106, 84.1 R, 242/84.1 K, 129.5, 129.6, 146, 134, 136, 141, 129.62, 129.7, 129.71, 129.72; 43/25, 25.2

[56] References Cited
UNITED STATES PATENTS

| | | | |
|---|---|---|---|
| 484,563 | 10/1892 | Syllwasschy | 242/129.6 |
| 1,870,659 | 8/1932 | Stephenson | 242/141 |
| 2,003,143 | 5/1935 | Goddemeyer | 242/141 |
| 3,261,569 | 7/1966 | Bedell | 242/146 X |
| 3,399,847 | 9/1968 | Slate | 242/129.6 |
| 3,830,007 | 8/1974 | Linke, Sr. | 242/84.1 R X |

*Primary Examiner*—Stanley N. Gilreath
*Assistant Examiner*—John M. Jillions
*Attorney, Agent, or Firm*—Woodford R. Thompson, Jr.

[57] ABSTRACT

A fishing line spool is supported on a rod while line is transferred to a reel also supported by the rod. The holder comprises a flexible webbing folded on itself and about the rod with side portions thereof adapted to extend along opposite sides of the spool which is supported by a transverse pin extending through openings in said side portions. Detachable means connects said side portions to each other above and below the spool.

5 Claims, 4 Drawing Figures

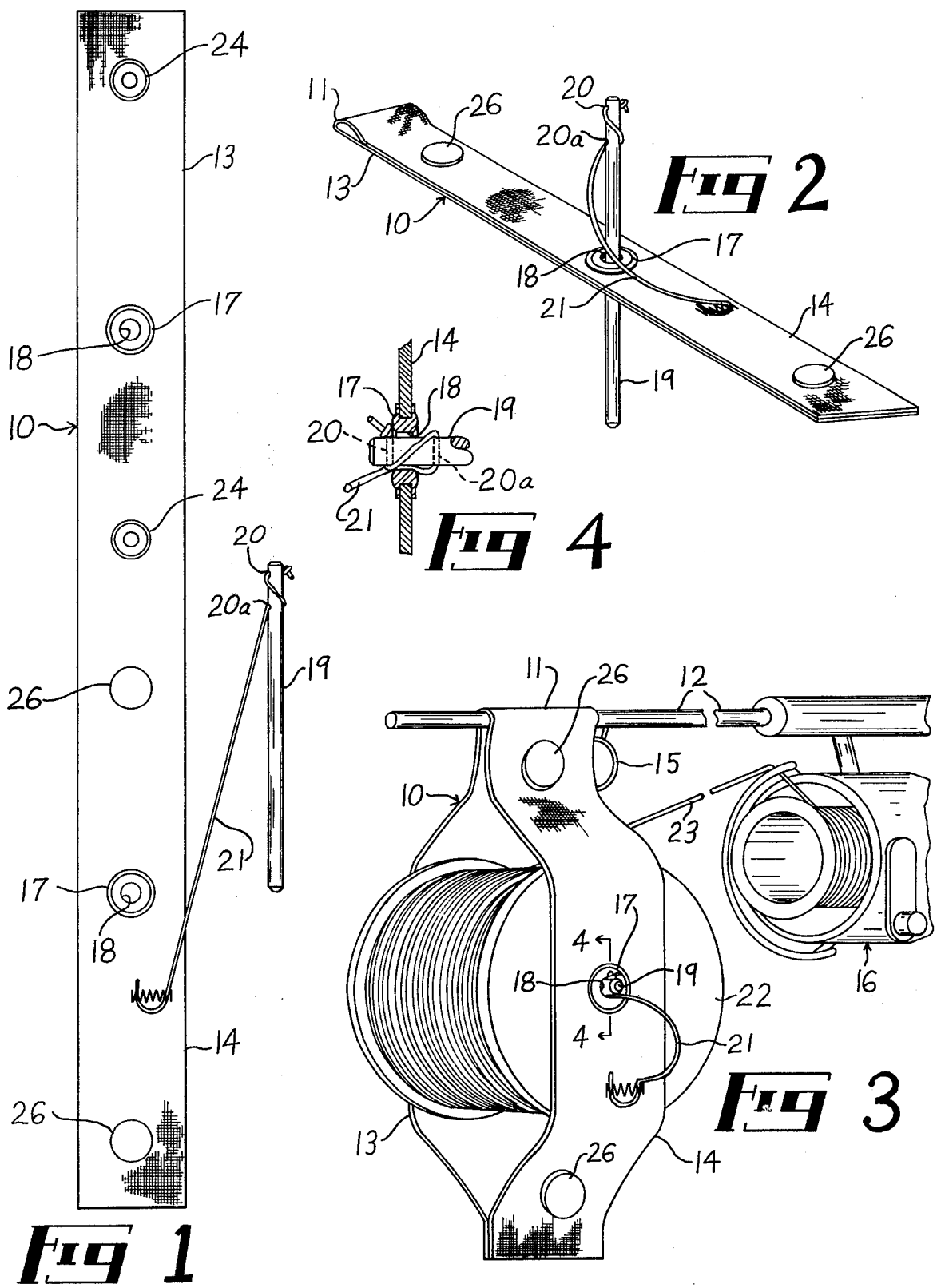

REEL-IN SPOOLED FISHLINE DISPENSER

BACKGROUND OF THE INVENTION

This invention relates to a fishing line spool holder which is supported by a rod and permits line to be transferred from the spool to a reel also supported by the rod without the line being twisted.

DESCRIPTION OF THE DRAWING

A fishing line spool holder embodying features of my invention is illustrated in the accompanying drawings, forming a part of this application, in which:

FIG. 1 is a side elevational view of the holder showing its webbing laid out flat and the spool supporting pin extending alongside the webbing;

FIG. 2 is a perspective view showing the webbing folded on itself with the spool supporting pin extending through openings in the webbing;

FIG. 3 is a perspective view, partly broken away, showing the holder in operating position; and, FIG. 4 is an enlarged sectional view taken along the line 4—4 of FIG. 3.

DETAILED DESCRIPTION

Referring now to the drawing for a better understanding of my invention I show an elongated flexible webbing 10 which may be formed of a suitable material, such as cotton or a synthetic material. As shown in FIGS. 2 and 3, the webbing 10 is of a length to fold on itself, as at 11, about a fishing rod 12 to provide depending side portions 13 and 14. The rod 12 is provided with the usual guides 15 and is carried by a conventional fishing reel 16.

Grommets 17 are carried by each of the side portions 13 and 14 to provide openings 18 which receive a spool supporting pin 19, as shown. The pin 19 is connected to the adjacent side portion 14 by a flexible cord-like member 21. Spaced apart, transverse openings 20 and 20a are provided in the pin 19 adjacent one end thereof for receiving the cord-like member 21. The grommet 17 carried by the side portion adjacent thereto is positioned between the openings 20 and 20a, as shown, so that adjacent portions of the cord-like member 21 limit axial movement of the pin 19 relative to the grommet. The pin 19 passes through the usual centrally disposed opening provided in a spool 22 which carries fishing line 23. The spool 22 is positioned between the side portions 13 and 14 with the lower ends of the side portions extending below the spool.

As shown in FIG. 1, the side portion 13 of the webbing 10 is provided with spaced apart male, snap-type fastener elements 24 at opposite sides of the adjacent grommet 17 which cooperate with female, snap-type fastener elements 26 carried by the side portion 14. It will be apparent that other means may be employed to detachably connect the side portions 13 and 14 to each other such as by providing cooperating gripping surfaces, one of which is in the form of a series of small hook-like members which are disposed to engage a felt-like surface. A suitable such fastening means is sold under the trade name "Velcro".

From the foregoing description, the operation of my fishing line spool holder will be readily understood. The webbing 10 is folded on itself over the fishing rod 12 above the guide 15 nearest the reel 16. The uppermost cooperating, fastener elements 24 and 26 adjacent the rod 12 are connected to each other. The spool 22 carrying the line 23 is then inserted between the horizontally aligned grommets 17. With the spool 22 in place the pin 19 is forced through the holes of the grommets 17 and the hole through the spool 22 whereby the side portions engage the sides of the spool 22 with a tight fit. The lowermost cooperating fastener elements 24 and 26 are then connected to each other and the fishing line 23 is attached to the reel 16. The spooled fishing line 23 is then dispensed from the spool 22 to the reel 16 by rotating the reel. Accordingly it takes only one person to spool the line onto the reel 16. Furthermore, the line is not permitted to twist as it is reeled in from the spool 22.

What I claim is:

1. In a holder for supporting a spool of line from a rod as line is transferred from the spool to a fishing reel carried by said rod,
   a. an elongated flexible webbing of a length to be folded on itself about said rod and provide depending side portions,
   b. horizontally aligned openings through said side portions,
   c. a spool supporting pin extending through said openings and disposed to support a spool of line between said side portions with said side portions engaging the sides of said spool and extending below said spool,
   d. detachable means connecting said side portions of said webbing to each other intermediate said spool and said rod, and
   e. detachable means connecting said side portions of said webbing to each other beneath said spool.

2. A holder as defined in claim 1 in which said openings through said side portions are defined by grommets carried by said side portions.

3. A holder as defined in claim 2 in which said spool supporting pin is connected to one of said side portions by a flexible cord-like member.

4. A holder as defined in claim 3 in which spaced apart transverse openings are provided in said pin adjacent one end thereof for receiving said flexible cord-like member and the grommet carried by the side portion adjacent thereto is positioned between said transverse openings.

5. A holder as defined in claim 1 in which said detachable means connecting said side portions to each other comprises cooperating snap-type fasteners.

* * * * *